US006374147B1

(12) United States Patent
Rockwood

(10) Patent No.: US 6,374,147 B1
(45) **Date of Patent: *Apr. 16, 2002**

(54) APPARATUS AND METHOD FOR PROVIDING COORDINATED CONTROL OF A WORK IMPLEMENT

(75) Inventor: Brian D. Rockwood, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/282,111

(22) Filed: Mar. 31, 1999

(51) Int. Cl.$^7$ ......................... G05B 11/32; G05B 11/01; G06F 19/00; B66F 9/14

(52) U.S. Cl. ............................ 700/69; 700/71; 701/50; 414/699; 414/713

(58) Field of Search ............................... 700/61–65, 69, 700/71; 414/699, 700, 713; 701/50

(56) References Cited

U.S. PATENT DOCUMENTS

| | | | | |
|---|---|---|---|---|
| 4,037,742 A | | 7/1977 | Gustafsson | |
| 4,712,376 A | | 12/1987 | Hadank et al. | 60/427 |
| 4,722,044 A | | 1/1988 | Heiser et al. | 364/167 |
| 4,760,513 A | | 7/1988 | Edwards | 364/174 |
| 4,776,750 A | * | 10/1988 | Griswold, Jr. et al. | 414/698 |
| 4,791,549 A | | 12/1988 | Heiser et al. | 364/167.01 |
| 4,910,662 A | | 3/1990 | Heiser et al. | 364/167.01 |
| 4,964,780 A | * | 10/1990 | Karvonen | 414/728 |
| 5,062,755 A | | 11/1991 | Lawrence et al. | |
| 5,160,239 A | | 11/1992 | Allen et al. | 414/699 |
| 5,257,177 A | | 10/1993 | Bach et al. | 364/167.01 |
| 5,424,623 A | | 6/1995 | Allen et al. | 318/568.18 |
| 5,467,829 A | | 11/1995 | Barton et al. | 172/4.5 |
| 5,768,810 A | | 6/1998 | Ahn | |
| 6,099,236 A | * | 8/2000 | Wiechman | 414/708 |
| 6,233,511 B1 | * | 5/2001 | Berger et al. | 701/50 |

FOREIGN PATENT DOCUMENTS

| | | |
|---|---|---|
| EP | 0397076 | 11/1990 |
| EP | 735202 A1 | 2/1996 |
| JP | 10316392 | 12/1998 |

* cited by examiner

*Primary Examiner*—William Grant
*Assistant Examiner*—Elliot Frank
(74) *Attorney, Agent, or Firm*—Marla L. Hudson

(57) ABSTRACT

An apparatus and method for providing coordinated control of a work implement of a work machine. The implement includes a boom having a first end portion and a second end portion, with the first end portion pivotally connected to the frame and the second end portion pivotally connected to a load-engaging member. The apparatus includes a boom position sensor adapted for providing a boom position signal, and an input device adapted for delivering a desired boom velocity signal indicative of the desired velocity of the boom. The desired velocity of the boom includes a desired angular velocity and a desired linear velocity. The apparatus receives the boom position signal and the desired boom velocity signal, and determines an actual velocity of the boom as a function of the boom position signal. The apparatus also compares the actual velocity of the boom and the desired velocity of the boom, and modifies the desired angular velocity and the desired linear velocity in response to a difference between the desired and actual velocities of the boom.

35 Claims, 5 Drawing Sheets

APPARATUS AND METHOD FOR PROVIDING COORDINATED CONTROL OF A WORK IMPLEMENT

TECHNICAL FIELD

This invention relates generally to an apparatus and method for controlling a work implement of a work machine and, more particularly, to an apparatus and method for providing coordinated control of the work implement in order to produce linear movement of the work implement.

BACKGROUND ART

Work machines, such excavators, backhoe loaders, wheel loaders, telescopic material handlers, and the like, are adapted for digging, loading, pallet-lifting, etc. These operations usually require the use of two or more manually-operated control levers for controlling the position and orientation of the work implement.

As an example, a telescopic material handler includes a telescoping boom having a load-engaging member, e.g., pallet lifting forks, connected at one end of the boom. Two control levers are used to independently actuate hydraulic cylinders adapted for controlling the angle of the boom with respect to a reference plane, and the length of the boom, respectively.

Frequently, linear or straight-line movement of the forks are required, e.g., when the forks of the telescopic material handler are to be driven under a pallet in order to lift the pallet. In order to effect such linear movement, the angle of the boom and the length of the boom must be simultaneously controlled. Extensive operator skill is required for coordinating control of the levers while performing these complex operations, thus increasing operator fatigue for skilled operators, and the training time required for lesser skilled operators.

The present invention is directed to overcoming one or more of the problems as set forth above.

DISCLOSURE OF THE INVENTION

In one aspect of the present invention, an apparatus for providing coordinated control of a work implement of a work machine having a frame is disclosed. The implement includes a boom pivotally connected to the frame. The apparatus includes a boom position sensor adapted for providing a boom position signal, and an input device adapted for delivering a desired boom velocity signal indicative of the desired velocity of the boom. The desired velocity includes a desired angular velocity and a desired linear velocity. The apparatus receives the boom position signal and the desired boom velocity signal, and determines an actual velocity of the boom as a function of the boom position signal. The apparatus further compares the actual velocity of the boom and the desired velocity of the boom, and modifies the desired angular velocity and the desired linear velocity in response to a difference between the desired and actual velocities of the boom.

In another aspect of the present invention, a method for providing coordinated control of a work implement of a work machine is disclosed. The method includes the steps of sensing a position of the boom, and responsively delivering a boom position signal. The method also includes the step of delivering a desired boom velocity signal indicative of the desired velocity of the boom, the desired velocity including a desired angular velocity and a desired linear velocity. The method further includes the steps of determining an actual velocity of the boom as a function of the boom position signal, comparing the actual velocity of the boom and the desired velocity of the boom, and modifying the desired angular velocity and the desired linear velocity in response to a difference between the actual and desired velocities of the boom.

BEST MODE FOR CARRYING OUT THE INVENTION

With reference to FIGS. 1–5, the present invention provides an apparatus and method for providing coordinated control of a work implement 160 of a work machine 100. For purposes of discussion, the following description will be directed to a telescopic material handler 100. However, it is to be realized that any number of other types of work machines, such as backhoe loaders, wheel loaders, excavators, and the like, may be substituted without departing from the spirit of the invention.

Figure 1:
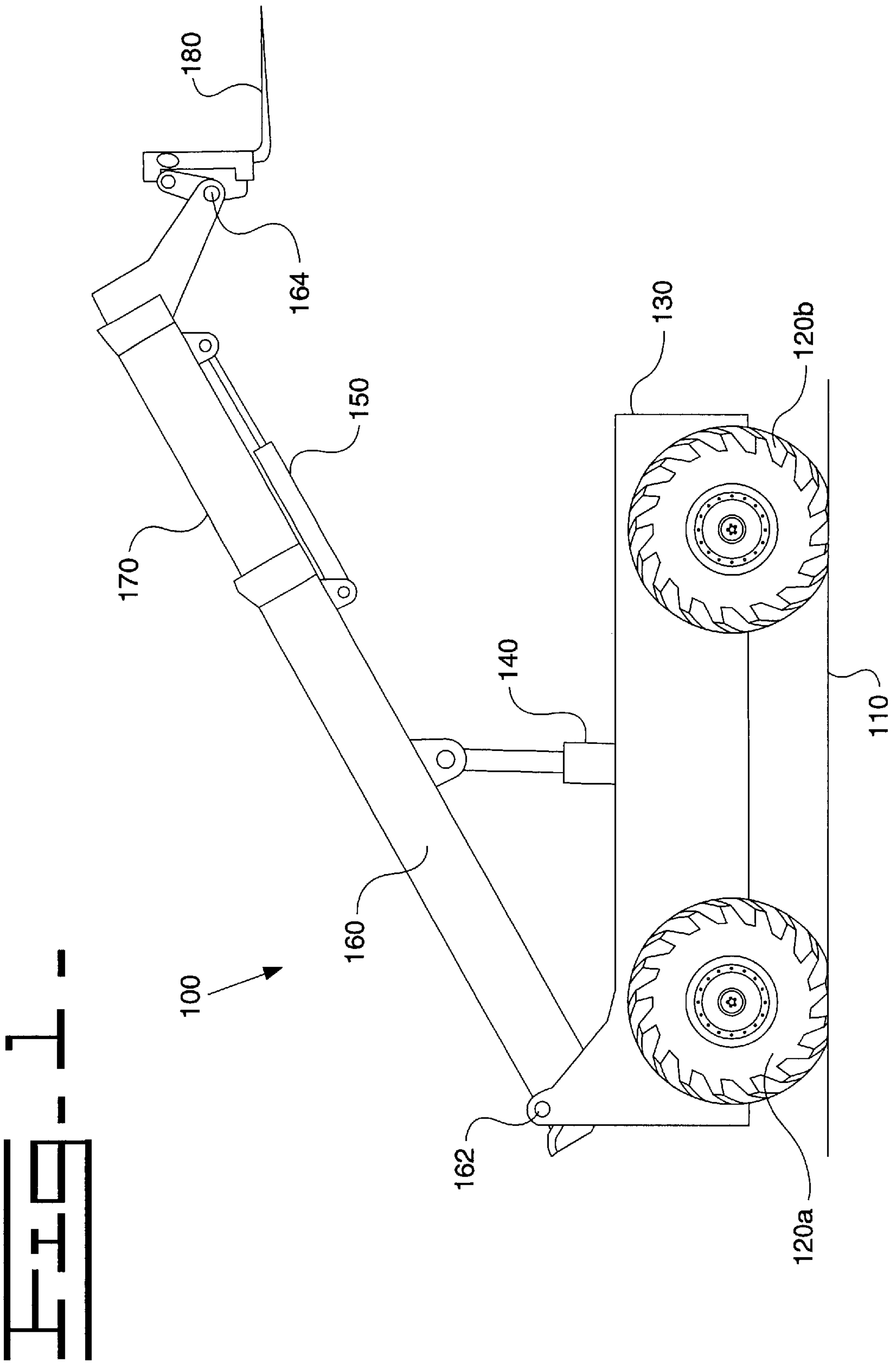
FIG. 1 is a diagrammatic illustration of a work machine suitable for use with an embodiment of the present invention.

With particular reference to FIG. 1, an illustration of a telescopic material handler 100 is shown. The telescopic material handler 100 includes a machine frame 130 which can be driven on wheels 120*a*, 120*b* or other ground-engaging supports, such as tracks. The telescopic material handler 100 further includes a boom 160 having a first end portion 162 and a second end portion 164. The boom 160 is pivotally connected to the frame 130 at the first end portion 162 of the boom 160.

The boom 160 includes a telescopic member 170 movable between a fully retracted length and a fully extended length. A load-engaging member 180 is pivotally connected to the telescopic member 170 at the second end portion 164 of the boom 160. In the preferred embodiment, the load-engaging member 180 includes a fork 180. However, other kinds and types of load-engaging members 180 may be used, such as a bucket or other material handling device, without deviating from the scope of the invention.

The angle of the boom 160 with respect to the frame 130 is controlled by a first actuator 140 connected between the frame 130 and the boom 160. The extension and retraction of the telescopic member 170 is controlled by a second actuator 150 connected between the boom 160 and the telescopic member 170. Preferably, the first and second actuators 140, 150 include a fluid-operated cylinder, for example a hydraulic cylinder.

For illustrative purposes, only two actuators 140, 150 are shown. However, it is to be understood, that any number of actuators may be used in the present invention as desired. For example, a third actuator may be provided for maintaining the attitude of the fork 180 in a level condition.

Figure 2:
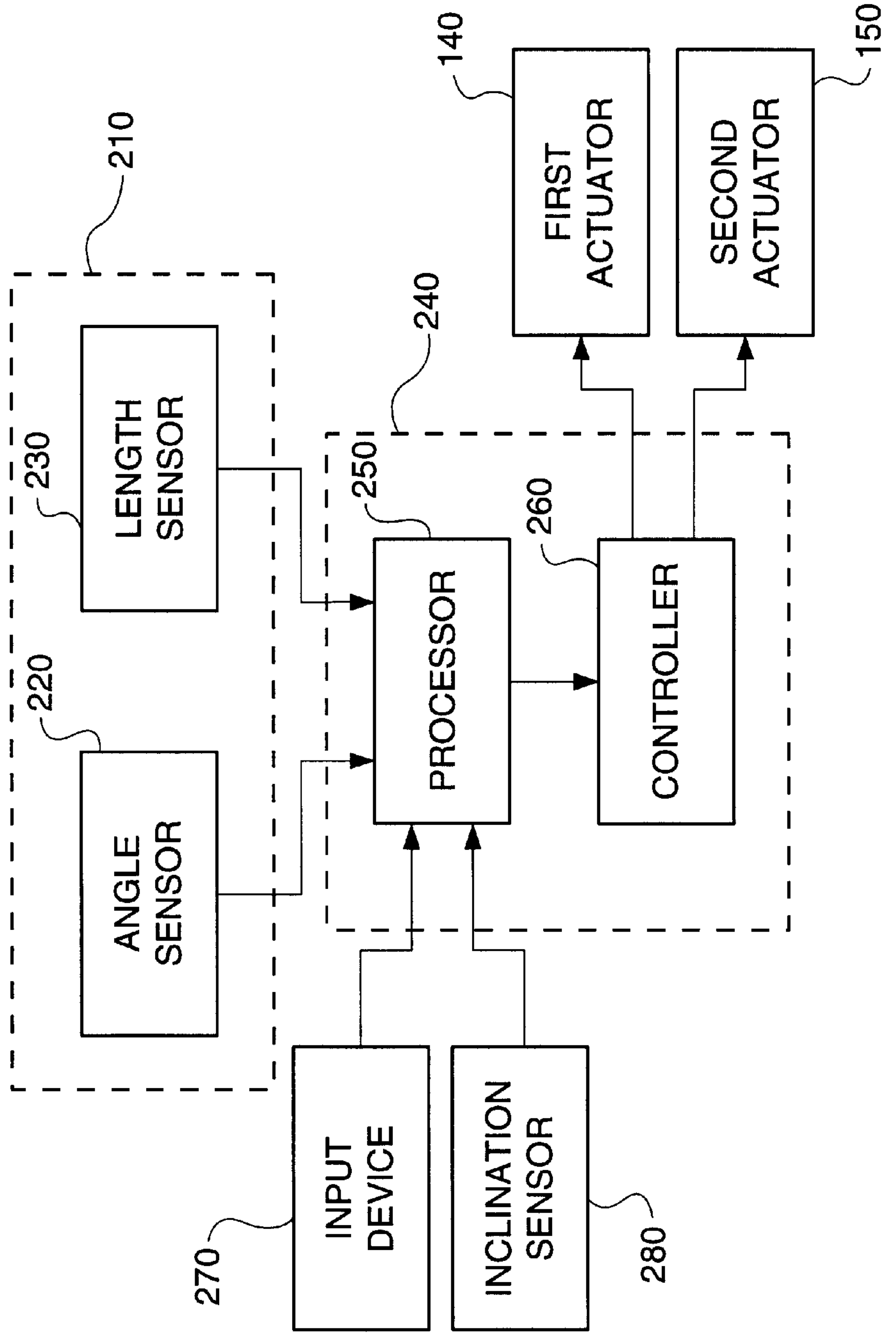
FIG. 2 is a block diagram illustrating an embodiment of the present invention.

With reference to FIG. 2, the first and second actuators 140, 150 are controlled in accordance with input commands provided by an input device 270 located on the work machine 100. The input device 270 operates hydraulic valves (not shown) that control the delivery of pressurized fluid to the first and second actuators 140, 150.

In the preferred embodiment, the input device 270 includes a joystick. However, other types of input devices 270, such as hand-operated control levers, foot pedals, a keypad, and the like, may be substituted without departing from the scope of the invention.

The operator-controlled joystick 270 delivers a desired boom velocity signal to a control system 240 located on the work machine 100, in response to movement of the joystick 270 along predefined axes. In the preferred embodiment, the joystick 270 has two degrees of movement. Left and right movement of the joystick 270 along a first axis (x axis) provides linear horizontal motion of the load-engaging member 180 at the pivoted connection 164. Likewise, forward and backward movement of the joystick 270 along a second axis (y axis) perpendicular to the first axis, provides linear vertical motion of the load-engaging member 180 at the pivoted connection 164.

The control system 240 also receives boom position signals indicative of the position and orientation of the boom 160 from a boom position sensor 210 located on the work machine 100. The boom position sensor 210 includes an angle sensor 220 adapted for sensing the angle of the boom 160 relative to the frame 130, and responsively delivering a boom angle signal. The boom position sensor 210 further includes a length sensor 230 adapted for sensing the length or extension of the telescopic member 170 of the boom 160, and responsively delivering a boom length signal.

It can be appreciated by those skilled in the art that other types of sensors and combinations thereof may be included in the boom position sensor 210 without deviating from the present invention. As an example, a fork sensor may be included for sensing the inclination or attitude of the fork 180, relative to the telescopic member 170, and responsively delivering a fork position signal.

The control system 240 further receives an inclination signal from an inclination sensor 280 located on the work machine 100. The inclination sensor 280 is adapted for sensing an angle of inclination of the frame 130 relative to a reference plane 110. The specific operation of the control system 240 will be discussed in more detail below.

In the preferred embodiment, the control system 240 includes a processor 250, and both read only and random access memory. The processor 250 receives and processes the boom angle signal, the boom length signal, and the inclination signal, as well as the desired boom velocity signal provided by the input device 270. Through execution of control routines, such as software programs stored in memory, the processor 250 generates and delivers a command signal to a controller 260. The controller 260 automatically coordinates the flow of hydraulic fluid to both the first and second actuators 140, 150, in response to the command signal.

Although the input device 270 and control system 240 have been described as being located on the work machine 100 and electrically connected together, one or both elements may be stationed remotely from the work machine 100. For example, the control system 240 may be located at a central site office, and adapted to communicate with the boom position sensor 210, the inclination sensor 280, the input device 270, the first actuator 140, and the second actuator 150 through a wireless communication link.

Figure 3:
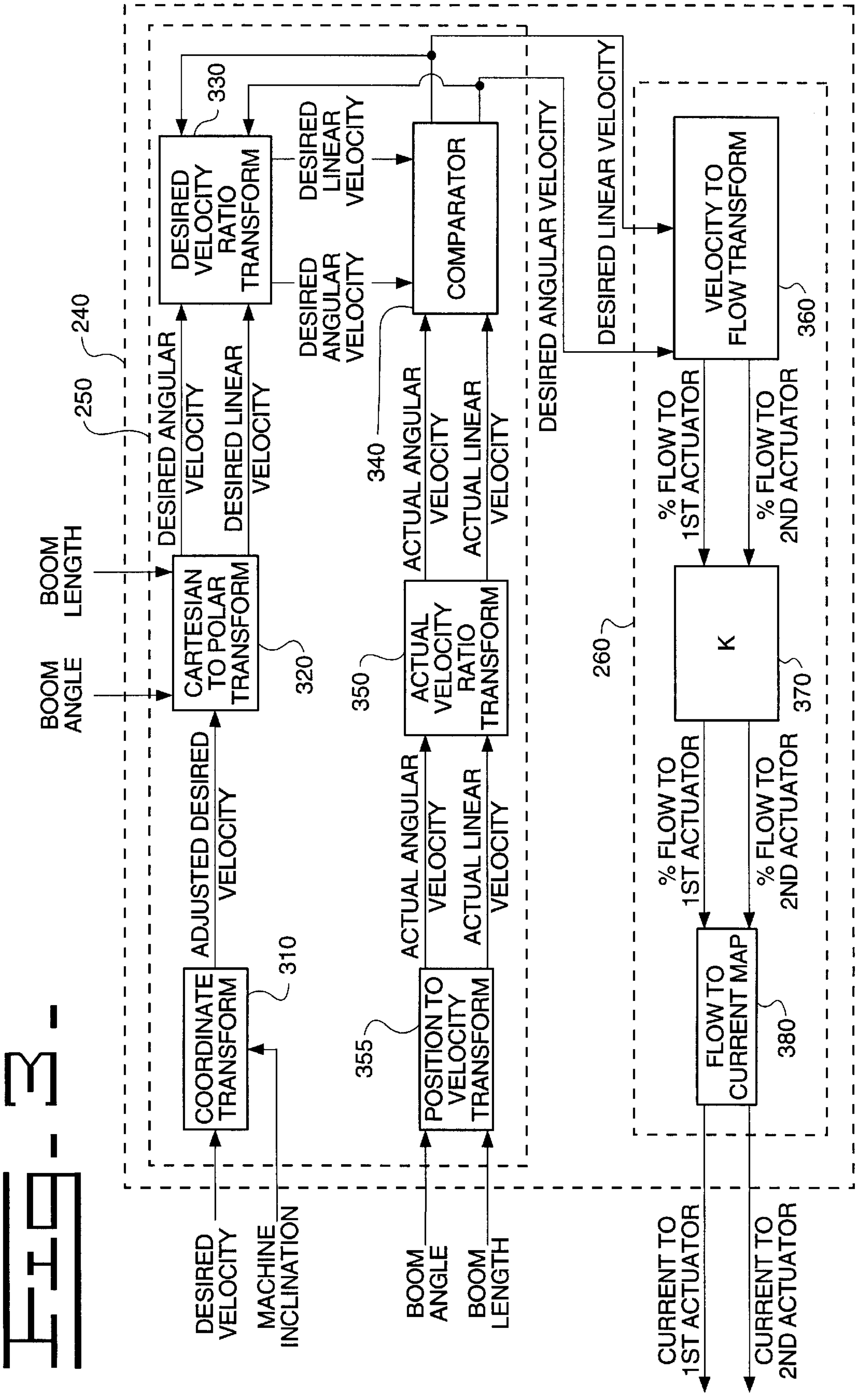
FIG. 3 is a block diagram illustrating an embodiment of a control system of the present invention.

Referring now to FIG. 3, a block diagram of the control system 240 is shown. The input commands, which are generated by the input device 270, are shown as desired velocity requests. The input commands are in Cartesian coordinates, and represent the desired x and y velocity of the boom 160 corresponding to the desired speed and direction of movement of the fork 180.

Based on the inclination of the machine 100 relative to the reference plane 110, the desired velocity is transformed or adjusted at control box 310.

The adjusted desired velocity requests, represented in Cartesian coordinates, are transformed at control box 320 into corresponding polar coordinates based on the position and orientation of the boom 160. The output of the Cartesian to polar transform control box 320 is the desired angular velocity of the boom 160, which is controlled by the first actuator 140, and the desired linear velocity of the boom 160, which is controlled by the second actuator 150.

Boom position signals representing the position and orientation of the boom 160 are transformed at control box 355 into an actual angular velocity of the boom 160 and an actual linear velocity of the boom 160. More specifically, the actual angular velocity is determined by computing the derivative of the boom angle signals, as sensed by the angle sensor 220. Similarly, the actual linear velocity is determined by computing the derivative of the boom length signals, as sensed by the length sensor 230.

The desired velocity commands are transformed into a desired velocity ratio at control box 330, and the actual velocity commands are transformed into an actual velocity ratio at control box 350. More specifically, the actual and desired velocity ratios, represented as percentages, are calculated in accordance with the following equations:

$$\text{Angular velocity }(\%) = \frac{\text{Angular velocity}}{|\text{Angular velocity}| + |\text{Linear velocity}|}$$

$$\text{Linear velocity }(\%) = \frac{\text{Linear velocity}}{|\text{Angular velocity}| + |\text{Linear velocity}|}$$

It is to be understood that the units for angular velocity and linear velocity in the above equation have been adjusted in order to provide common units.

Figure 4:
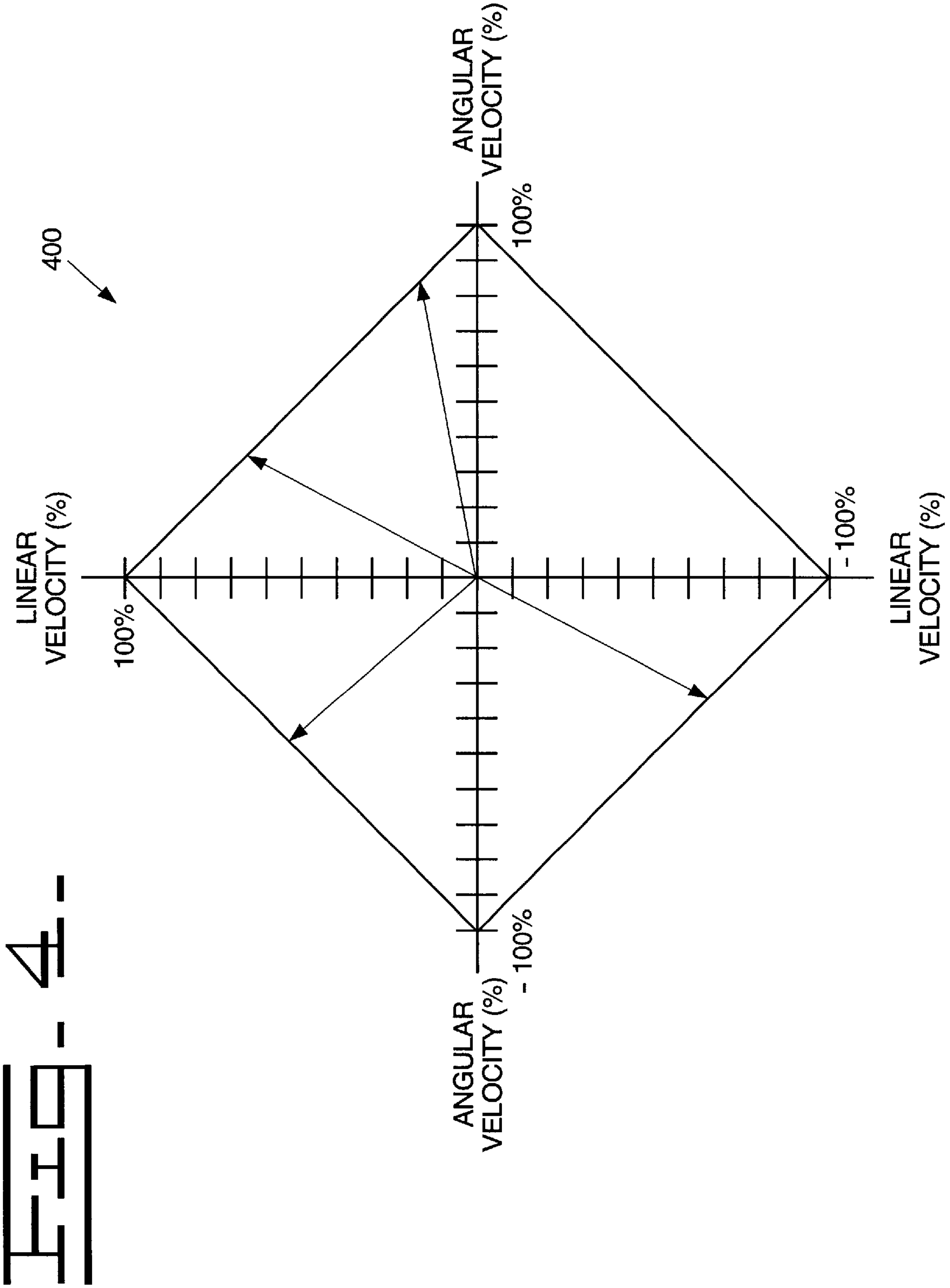
FIG. 4 illustrates examples of a plurality of velocity ratio vectors associated with an embodiment of the present invention.

Together, the combined angular velocity ratio and linear velocity ratio represent a velocity ratio vector 400. FIG. 4 shows examples of a plurality of velocity ratio vectors 400.

Preferably, the desired and actual velocity ratios represent the desired and actual velocities of the first actuator 140, relative to the desired and actual velocities of the second actuator 150.

The desired velocity ratio is compared to the actual velocity ratio at control box 340, and a compensating error is generated. The compensating error is used to modify the desired velocity ratio, i.e., the desired angular velocity ratio and the desired linear velocity ratio.

As an example, a desired velocity ratio comprising a desired angular velocity ratio of 60% and a desired linear velocity ratio of 40% is requested by the input device 270. However, the actual velocity ratio comprises an actual angular velocity ratio of 65%, and an actual linear velocity ratio of 35%. Thus, the compensating error is 5%. Therefore, the desired angular velocity ratio is decreased by 5% and the desired linear velocity ratio is increased by 5%, resulting in a desired angular velocity ratio of 55% and a desired linear velocity ratio of 45%.

The desired angular velocity and the desired linear velocity ratios are converted to desired flows to the respective actuators in a velocity to flow transform control box 360.

Preferably, a look-up table or map is used to convert the desired velocity ratio values to desired flows to the first and second actuators 140, 150.

The desired flows are scaled in control box 370 by a gain factor, K, and mapped to current values for output to the first and second actuators 140, 150 by a flow to current map 380. The current values are then delivered to electro-hydraulic control valves which control the fluid flow to the respective actuators.

Figure 5:
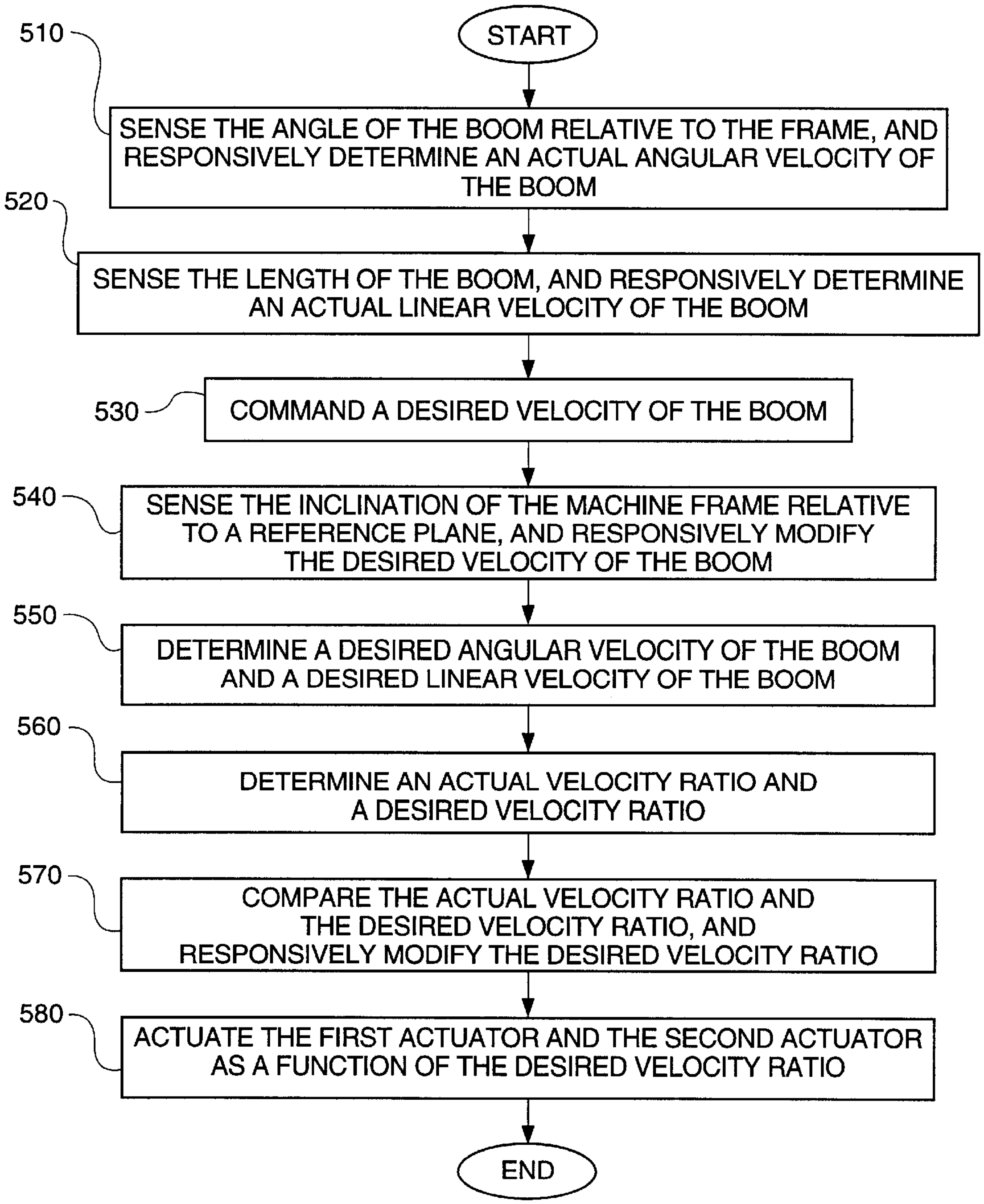
FIG. 5 is a flow diagram illustrating an embodiment of the present invention.

With reference to FIG. 5, a flow diagram is shown illustrating the operation of an embodiment of the present invention.

In a first control box 510, the angle of the boom 160 relative to the frame 130 is sensed by the angle sensor 220, and the actual angular velocity of the boom 160 is responsively determined.

In a second control box 520, the length of the boom 160 is sensed by the length sensor 230, and the actual linear velocity of the boom 160 is responsively determined.

Control then proceeds to a third control box 530 in which the desired velocity of the boom 160 is commanded by the input device 270. The inclination of the machine frame 130 relative to the reference plane 110 is sensed by the inclination sensor 280 in a fourth control box 540, and the desired velocity of the boom 160 is responsively modified.

In a fifth control box 550, a desired angular velocity and a desired linear velocity is determined by the control system 240 as a function of the desired velocity of the boom 160 commanded by the input device 270, the angle of the boom 160 relative to the frame 130, and the length of the boom 160.

Control then proceeds to a sixth control block 560 and a seventh control block 570. An actual velocity ratio and a desired velocity ratio is determined in the sixth control block 560. The actual velocity ratio is representative of the actual angular velocity relative to the actual linear velocity. Similarly, the desired velocity ratio is indicative of the desired angular velocity relative to the desired linear velocity.

The actual velocity ratio is compared to the desired velocity ratio, and the desired velocity ratio, i.e., the desired angular velocity and the desired linear velocity, is responsively modified in the seventh control block 570.

In an eighth control block 580, the first and second actuators 140, 150 are actuated as a function of the desired velocity ratio.

INDUSTRIAL APPLICABILITY

As one example of an application of the present invention, telescopic material handlers are used generally for loading various types of material. In such applications, linear movement of the boom is often required. For example, when the forks of the telescopic material handler are to be driven under a pallet in order to lift the pallet, linear movement of the fork in the horizontal plane is required. Similarly, when the pallet is to be lifted in the vertical direction, linear movement of the fork in the vertical plane is required. In both situations, the length and angle of the boom must be simultaneously coordinated to effect such movement.

The control system of the present invention receives a desired velocity request from an operator via an input device, e.g., a joystick. The desired velocity includes a desired angular velocity of the boom, and a desired linear velocity of the boom. The desired angular velocity and the desired linear velocity represents the desired velocities of the respective hydraulic cylinders. The desired velocities are converted to desired flows to the respective cylinders.

However, in some situations, one or more of the cylinders does not receive the desired flow due to the increased demand of another cylinder. As a result, the cylinders do not operate in proportion to operator demand. Operators frequently experience fatigue attempting to avoid or overcome such situations.

The control system of the present invention attempts to eliminate problems of this type, by calculating a compensating error as a function of a comparison between the actual velocity of the boom, and the desired velocity of the boom. This compensating error is used to modify the desired angular velocity and the desired linear velocity, which in turn are used to simultaneously coordinate the flow to the respective hydraulic cylinders to provide linear movement of the fork, thus reducing operator fatigue and improving efficiency.

Other aspects, objects, and features of the present invention can be obtained from a study of the drawings, the disclosure, and the appended claims.

What is claimed is:

1. An apparatus for providing coordinated control of an implement of a work machine having a frame, the implement comprising a boom having a first end portion and a second end portion, with the first end portion pivotally connected to the frame, comprising:

a boom position sensor adapted for delivering a boom position signal;

an input device adapted for delivering a desired boom velocity signal indicative of a desired velocity of the boom, the desired velocity including a desired angular velocity and a desired linear velocity; and a control system adapted for receiving the boom position signal and the desired boom velocity signal, and determining an actual velocity of the boom, an actual velocity ratio, and a desired velocity ratio, the control system being further adapted for comparing the actual velocity of the boom and the desired velocity of the boom, and modifying the desired angular velocity and the desired linear velocity as a function of said actual and desired velocity ratios in response to a difference between the desired and actual velocities of the boom.

2. An apparatus, as set forth in claim 1, further comprising:

a first actuator associated with the boom;

a second actuator associated with the boom; and wherein the control system is adapted for actuating the first actuator and the second actuator as a function of the desired angular velocity and the desired linear velocity, respectively.

3. An apparatus, as set forth in claim 2, wherein the first actuator is adapted for controlling an angle of the boom relative to the frame.

4. An apparatus, as set forth in claim 2, wherein the second actuator is adapted for controlling a length of the boom.

5. An apparatus, as set forth in claim 2, wherein each of the first and second actuators includes a hydraulic cylinder.

6. An apparatus, as set forth in claim 1, wherein the boom position sensor includes an angle sensor adapted for sensing an angle of the boom relative to the frame, and responsively delivering a boom angle signal.

7. An apparatus, as set forth in claim 1, wherein the boom position sensor includes a length sensor adapted for sensing a length of the boom, and responsively delivering a boom length signal.

8. An apparatus, as set forth in claim 7, wherein the boom includes a telescopic member movable between a fully retracted length and a fully extended length, wherein the length sensor is adapted for sensing a length of the telescopic member.

9. An apparatus, as set forth in claim 1, wherein the boom position sensor includes an angle sensor adapted for sensing an angle of the boom relative to the frame, and a length sensor adapted for sensing a length of the boom, wherein the angle sensor and the length sensor are adapted for delivering a boom angle signal and a boom length signal, respectively; and wherein the control system is adapted for receiving the boom angle signal and the boom length signal, and responsively determining an actual angular velocity and an actual linear velocity.

10. An apparatus for providing coordinated control of an implement of a work machine having a frame, the implement comprising a boom having a first end portion and a second end portion, with the first end portion pivotally connected to the frame, comprising:

a boom position sensor adapted for delivering a boom position signal, wherein the boom position sensor includes an angle sensor adapted for sensing an angle of the boom relative to the frame, and a length sensor adapted for sensing a length of the boom, wherein the angle sensor and the length sensor are adapted for delivering a boom angle signal and a boom length signal, respectively;

an input device adapted for delivering a desired boom velocity signal indicative of a desired velocity of the boom, the desired velocity including a desired angular velocity and a desired linear velocity; and a control system adapted for receiving the boom position signal and the desired boom velocity signal, and determining an actual velocity of the boom, the control system being further adapted for comparing the actual velocity of the boom and the desired velocity of the boom, and modifying the desired angular velocity and the desired linear velocity in response to a difference between the desired and actual velocities of the boom, wherein the control system is adapted for receiving the boom angle signal and the boom length signal, and responsively determining an actual angular velocity and an actual linear velocity, wherein the control system is adapted for determining an actual angular velocity ratio and an actual linear velocity ratio;

wherein the actual angular velocity ratio is computed by dividing the actual angular velocity by a summation of both an absolute value of the actual angular velocity and an absolute value of the actual linear velocity; and wherein the actual linear velocity ratio is computed by dividing the actual linear velocity by a summation of both an absolute value of the actual angular velocity and an absolute value of the actual linear velocity.

11. An apparatus, as set forth in claim 10, wherein the control system is adapted for determining an actual velocity ratio as a function of the actual angular velocity ratio and the actual linear velocity ratio.

12. An apparatus, as set forth in claim 11, wherein the control system is adapted for determining a desired angular velocity ratio and a desired linear velocity ratio;

wherein the desired angular velocity ratio is computed by dividing the desired angular velocity by a summation of both an absolute value of the desired angular velocity and an absolute value of the desired linear velocity; and wherein the desired linear velocity ratio is computed by dividing the desired linear velocity by a summation of both an absolute value of the desired angular velocity and an absolute value of the desired linear velocity.

13. An apparatus, as set forth in claim 12, wherein the control system is adapted for determining a desired velocity ratio as a function of the desired angular velocity ratio and the desired linear velocity ratio.

14. An apparatus, as set forth in claim 13, wherein the desired angular velocity ratio and the desired linear velocity ratio are responsively modified based on a difference between the desired velocity ratio and the actual velocity ratio.

15. An apparatus, as set forth in claim 1, wherein the input device is adapted for commanding a desired velocity of the boom along a first axis, and a desired velocity of the boom along a second axis, wherein the first axis is perpendicular to the second axis.

16. An apparatus, as set forth in claim 1, further including an inclination sensor adapted for sensing an angle of inclination of the frame relative to a reference plane, and responsively delivering an inclination signal; and wherein the control system is adapted for receiving the inclination signal, and responsively modifying the desired velocity of the boom.

17. An apparatus, as set forth in claim 1, wherein the input device includes a control lever.

18. An apparatus, as set forth in claim 1, wherein the input device includes a joystick.

19. An apparatus, as set forth in claim 1, wherein the input device is located on the work machine.

20. An apparatus, as set forth in claim 1, wherein the input device is located remote from the work machine.

21. An apparatus, as set forth in claim 1, wherein the control system is located remote from the work machine, the control system being adapted for receiving the boom position signal and the desired boom velocity signal through a wireless communication link.

22. An apparatus, as set forth in claim 2, further including a load-engaging member pivotally connected to the second end portion of the boom, wherein the control system is adapted for simultaneously actuating each of the first actuator and the second actuator to produce linear motion of the load-engaging member at the pivoted connection to the boom.

23. An apparatus, as set forth in claim 22, wherein the load-engaging member includes a fork.

24. An apparatus, as set forth in claim 22, wherein the load-engaging member includes a bucket.

25. A method for providing coordinated control of an implement of a work machine having a frame, the work implement comprising a boom pivotally connected to the frame, comprising the steps of:

sensing a position of the boom, and responsively delivering a boom position signal;

delivering a desired boom velocity signal indicative of a desired velocity of the boom, the desired velocity including a desired angular velocity and a desired linear velocity;

determining an actual velocity of the boom as a function of the boom position signal;

determining an actual velocity ratio and a desired velocity ratio as a function of said actual velocity and said desired velocity;

comparing the actual velocity of the boom and the desired velocity of the boom; and modifying the desired angular velocity and the desired linear velocity as a function of said actual velocity and desired velocity ratios in response to a difference between the actual and desired velocities of the boom.

26. A method, as set forth in claim 25, further comprising the step of actuating a first actuator and a second actuator as a function of the desired angular velocity and the desired linear velocity, respectively.

27. A method, as set forth in claim 25, wherein sensing the position of the boom includes the step of sensing an angle of the boom relative to the frame, and responsively delivering a boom angle signal.

28. A method, as set forth in claim 25, wherein sensing the position of the boom includes the step of sensing a length of the boom, and responsively delivering a boom length signal.

29. A method, as set forth in claim 25, wherein sensing the position of the boom includes the steps of:

sensing both an angle of the boom relative to the frame, and a length of the boom, and responsively delivering a boom angle signal and a boom length signal, respectively; and receiving the boom angle signal and the boom length signal, and responsively determining an actual angular velocity and an actual linear velocity.

30. A method for providing coordinated control of an implement of a work machine having a frame, the work implement comprising a boom pivotally connected to the frame, comprising the steps of:

sensing both an angle of the boom relative to the frame, and a length of the boom, and responsively delivering a boom angle signal and a boom length signal, respectively;

receiving the boom angle signal and the boom length signal, and responsively determining an actual angular velocity and an actual linear velocity;

delivering a desired boom velocity signal indicative of a desired velocity of the boom, the desired velocity including a desired angular velocity and a desired linear velocity;

determining an actual velocity of the boom as a function of the boom angle signal and a boom length signal;

determining an actual angular velocity ratio and an actual linear velocity ratio;

determining a desired angular velocity ratio and a desired linear velocity ratio;

comparing the actual velocity of the boom and the desired velocity of the boom; and modifying the desired angular velocity and the desired linear velocity in response to a difference between the actual and desired velocities of the boom.

31. A method, as set forth in claim 30, wherein determining the actual angular velocity ratio includes the step of dividing the actual angular velocity by a summation of both an absolute value of the actual angular velocity and an absolute value of the actual linear velocity;

wherein determining the actual linear velocity ratio includes the step of dividing the actual linear velocity by a summation of both an absolute value of the actual angular velocity and an absolute value of the actual linear velocity;

wherein determining the desired angular velocity ratio includes the step of dividing the desired angular velocity by a summation of both an absolute value of the desired angular velocity and an absolute value of the desired linear velocity; and wherein determining the desired linear velocity ratio includes the step of dividing the desired linear velocity by a summation of both an absolute value of the desired linear velocity and an absolute value of the desired angular velocity.

32. A method, as set forth in claim 31, further including the steps of:

determining an actual velocity ratio as a function of the actual angular velocity ratio and the actual linear velocity ratio; and determining a desired velocity ratio as a function of the desired angular velocity ratio and the desired linear velocity ratio.

33. A method, as set forth in claim 32, further including the step of modifying the desired angular velocity ratio and the desired linear velocity ratio in response to a difference between the desired velocity ratio and the actual velocity ratio.

34. A method, as set forth in claim 25, further including the step of sensing an angle of inclination of the frame relative to a reference plane, and responsively modifying the desired velocity of the boom.

35. A method for providing coordinated control of an implement of a work machine having a frame, the work implement comprising a boom having a first end portion and a second end portion, with the first end portion pivotally connected to the frame and the second end portion pivotally connected to a load-engaging member, comprising the steps of:

(a) sensing both an angle of the boom relative to the frame, and a length of the boom, and responsively delivering a boom angle signal and a boom length signal, respectively;

(b) receiving the boom angle signal and the boom length signal, and responsively determining an actual angular velocity and an actual linear velocity;

(c) delivering a desired boom velocity signal indicative of a desired velocity of the boom, the desired velocity including a desired angular velocity and a desired linear velocity;

(d) sensing an angle of inclination of the frame relative to a reference plane, and responsively modifying the desired velocity of the boom;

(e) determining an actual angular velocity ratio by dividing the actual angular velocity by a summation of both an absolute value of the actual angular velocity and an absolute value of the actual linear velocity;

(f) determining an actual linear velocity ratio by dividing the actual linear velocity by the summation of both the absolute value of the actual angular velocity and the absolute value of the actual linear velocity;

(g) determining a desired angular velocity ratio by dividing the desired angular velocity by a summation of both an absolute value of the desired angular velocity and an absolute value of the actual linear velocity;

(h) determining a desired linear velocity ratio by dividing the desired linear velocity by the summation of both the absolute value of the desired angular velocity and the absolute value of the desired linear velocity;

(i) determining an actual velocity ratio as a function of the actual angular velocity ratio and the actual linear velocity ratio;

(j) determining a desired velocity ratio as a function of the desired angular velocity ratio and the desired linear velocity ratio;

(k) modifying the desired angular velocity ratio and the desired linear velocity ratio in response to a difference between the desired velocity ratio and the actual velocity ratio; and (l) actuating a first actuator and a second actuator as a function of the desired velocity ratio.

* * * * *